United States Patent
Ripley et al.

(10) Patent No.: US 6,738,878 B2
(45) Date of Patent: May 18, 2004

(54) VERIFYING THE INTEGRITY OF A MEDIA KEY BLOCK BY STORING VALIDATION DATA IN THE CUTTING AREA OF MEDIA

(75) Inventors: Michael S. Ripley, Hillsboro, OR (US); Jeffrey B. Lotspiech, San Jose, CA (US); Atsushi Ishihara, Aoba-ku (JP); Taku Kato, Kamakura (JP); Yoshihisa Fukushima, Osaka (JP)

(73) Assignees: Intel Corporation, Santa Clara, CA (US); International Business Machines Corporation, Armonk, NY (US); Toshiba Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 182 days.

(21) Appl. No.: 09/823,718

(22) Filed: Mar. 30, 2001

(65) Prior Publication Data

US 2002/0087814 A1 Jul. 4, 2002

Related U.S. Application Data (63) Continuation-in-part of application No. 09/750,642, filed on Dec. 28, 2000.

(51) Int. Cl.⁷ .............................................. G06F 12/14
(52) U.S. Cl. ...................... 711/164; 713/185; 713/193; 711/111
(58) Field of Search .................. 711/111, 112, 163, 711/164; 713/182, 185, 193, 200

(56) References Cited

U.S. PATENT DOCUMENTS

| | | | | |
|---|---|---|---|---|
| 5,883,958 A | * | 3/1999 | Ishiguro et al. | 705/57 |
| 5,915,018 A | * | 6/1999 | Aucsmith | 380/201 |
| 6,161,179 A | * | 12/2000 | Seidel | 713/168 |
| 6,550,009 B1 | * | 4/2003 | Uranaka et al. | 713/168 |

FOREIGN PATENT DOCUMENTS

| | | |
|---|---|---|
| EP | 984-346 A1 | 3/2000 |
| WO | WO01/95327 A2 | 12/2001 |

OTHER PUBLICATIONS

PCT/US 01/49784, Dated mailed Jun. 12, 2002.
Intel Corporation et al: "Content Protection for Recordable Media Specification: DVD Book, Revision 0.94" 4C Entity, Oct. 18, 2000, XP002167964.
"Content Protection for Recordable Media Specification", Introduction and Common Cryptographic Elements, Intel Corporation International Business Machines Corporation, Matsushita Electric Industrial Co., Ltd. Toshiba Corporation, Revision 0.94, Oct. 18, 2000.
"Content Protection System Architecture", A Comprehensive Framework for Content Protection, Intel Corporation International Business Machines Corporation, Matsushita Electric Industrial Co., Ltd Toshiba Corporation , Revision 0.81, February 17, 2000.
"C2 Block Cipher Specification", Intel Corporation International Business Machines Corporation, Matsushita Electric Industrial Co., Ltd Toshiba Corporation, Revision 0.9, Jan. 11, 2000.

* cited by examiner

*Primary Examiner*—Gary Portka
(74) *Attorney, Agent, or Firm*—Libby H. Hope, Esq.

(57) ABSTRACT

A method for verifying the integrity of a media key block (MKB) by storing validation data in a validation area of a medium, such as a DVD-R or a DVD-RW. In one embodiment, validation data comprises a hash function on a media key block. In another embodiment, validation data comprises the Verification Data field of an MKB's Verify Media Key Record.

24 Claims, 9 Drawing Sheets

VERIFYING THE INTEGRITY OF A MEDIA KEY BLOCK BY STORING VALIDATION DATA IN THE CUTTING AREA OF MEDIA

This application is a continuation-in-part of presently co-pending U.S. patent application, Ser. No. 09/750,642 filed on Dec. 28, 2000, entitled "METHOD AND APPARATUS FOR VERIFYING THE INTEGRITY OF A MEDIA KEY BLOCK".

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD

This invention relates to static and dynamic information storage and retrieval. More particularly, this invention relates to methods, apparatus and systems for the protection of stored information from unauthorized access.

BACKGROUND

Information or content may be stored on a wide variety of media. As the speed and convenience of accessing and copying stored information have increased, the threat of unauthorized copying of the information has increased correspondingly. Various schemes have been employed to protect the stored information from unauthorized access. For instance, the content stored on the media may be encrypted with a secret key, or keys, known only to devices authorized to access the media. A disadvantage of only one key is the inability to revoke the authorization of a particular device, by changing the key, without revoking the authority of all devices to read the media. Some of the disadvantages of using multiple keys include the potentially large burden of transmitting and storing the keys for each particular device.

An alternative method developed to protect content from unauthorized copying uses a media key block (MKB) to authorize copying of the content, as described by a publication from 4C Entity, LLC, entitled "CONTENT PROTECTION FOR RECORDABLE MEDIA SPECIFICATION," Revision 0.94 (Oct. 18, 2000). Authorized devices process the MKB to calculate, as described in part below, a media key allowing an authorized device to copy the content. The MKB method uses a media unique key to bind encrypted content to the media from which it will be played back.

As keys are compromised and revoked, the MKB can become quite large, with a size of several megabytes not being unusual. Since many types of media have limited read-only space, it becomes necessary to store the MKB on writeable areas of the media. Storing the MKB on the writeable area creates a vulnerability of the MKB to direct malicious tampering. In such a direct attack, the intent of the tamperer will likely be to substitute an older MKB for the current MKB stored on the media. In the alternative, the tamperer may substitute a portion of an older MKB for a portion of the current MKB stored on the media. Since the older MKB will still contain keys that are revoked by the current MKB, the substitution will potentially compromise the content protection provided by the current MKB.

Even if the MKB is stored on the read-only area of the media, another weakness of the MKB approach is the ability for a man-in-the-middle attack to substitute an older MKB for the current MKB during the attempted processing of the current MKB. In the alternative, the man-in-the-middle attacker may substitute a portion of an older MKB for a portion of the current MKB during the attempted processing of the current MKB. Thus, a man-in-the-middle attack also potentially compromises the contept protection provided by the current MKB.

Thus, media without a valid MKB could be read and readers without authorization could read content stored on protected media. In a variation on the MKB approach, a hash value is calculated over the MKB and stored on the read-only area of the media. The reader reads the MKB, calculates a hash value of the MKB as read from the media and compares that hash value to the hash value as read from the read-only area. Calculating the hash value however imposes an undesirable delay upon the authorization process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In one aspect of the invention, a method for verifying the integrity of a media key block (MKB) by storing validation data in a validation area of a medium, such as a DVD-R or a DVD-RW, is disclosed.

In one embodiment, validation data may comprise a hash function on a media key block (MKB) to achieve compatibility with DVD-RAMs when the MKB is being verified in a drive-host configuration. In this embodiment, the drive reads the MKB from the control data area (CDA) of a disc, whether it is a DVD-RAM, a DVD-R, or a DVD-RW. A minor adjustment to the drive allows the drive to read the hash value from the CDA of a DVD-RAM or a narrow burst cutting area (NBCA) of a DVD-R or a DVD-RW, thus allowing the host to verify the authenticity of the MKB using previously established procedures.

In another embodiment, validation data may comprise a Verification Data field of an MKB's Verify Media Key Record to achieve simplified operation when the MKB is being verified by a consumer electronics player/recorder (hereinafter a "CE device"). In this embodiment a CE device reads the MKB from the CDA of a disc. A minor adjustment to the device allows it to read the Verification Data field from the CDA of a DVD-RAM or a narrow burst cutting area (NBCA) of a DVD-R or a DVD-RW, thus allowing the device to verify the authenticity of the MKB using previously established procedures.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read-only Memories), and magneto-optical disks, ROMs (Read-only Memories), RAMs (Random Access Memories), EPROMs (Erasable Programmable Read-only Memories), EEPROMs (Electromagnetic Erasable Programmable Read-only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Introduction

Herein, certain terminology is used to discuss features of the present invention. For example, content is information programmed by owners or licensees, such as broadcast or cable networks. "Content" can by any form of audible or visual information including business data, news, sports, artistic performances, entertainment, advertising, documentaries, talk, films, videos, cartoons, text, music and graphics.

Media

Media includes any mechanism that provides (i.e., stores and/or transmits) content in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); etc. Typically, content may be stored in encrypted form on media such as DVDs, CDs, floppy discs, flash memory arrays. Access control comes from the inability of an unauthorized device, or a device having revoked keys, to successfully process the MKB, validate the MKB and then decrypt the content.

Media Reader

A media reader is an electronic device that reads the content from the media. A media reader may also read data other than the content from the media. For instance, media reader may be a DVD drive or player, a CD drive or player, a floppy drive, a digital television, a digital VCR, a CPU of a personal computer, a processor or a circuit coupled to flash memory cells, or any other consumer electronics device capable of accessing content stored on the media. Devices which also write or record to the media, such as CD-RW drives, are also considered media readers.

Content Protection for Recordable Media (CPRM)

In embodiments of the invention, media readers may implement Content Protection for Recordable Media (CPRM) format for protecting content. CPRM defines a method for protecting content stored on a number of physical media types, including, but not limited to, DVD-RAM, DVD-R, and DVD-RW. The device requirements are explained in further detail in the section below entitled "Media Key Block".

Media Key Block

An MKB is formatted as a sequence of contiguous records, where each record begins with a record type field, followed by a record length field. An MKB is part of an MKB Frame that is constructed from n MKB Packs having data. Each MKB Frame begins with an MKB Descriptor, which is part of the first MKB Pack, or MKB Pack #0. Each of the first n−1 MKB Packs are filled completely. The nth MKB Pack may end up with unused bytes, which are zero-filled.

In order to process the MKB, each authorized device receives a set of "n" device keys. The "n" device keys are referred to as $Kd\_i$ (i=0, 1, ..., n−1). For each device key there is an associated column and row value in the MKB, referred to as column value ($Cd\_i$ for i=0, 1, ..., n−1) and row value ($Rd\_i$ for i=0, 1, ..., n−1), respectively. An authorized device will have at most one device key for each column of the MKB, although, an authorized device may have more than one device key per row.

The device keys and associated row and column values are kept secret. If a set of device keys is compromised, an updated MKB can be released that causes a device with the compromised set of device keys to calculate a different media key than is computed by the remaining compliant devices. In this way, the compromised device keys are "revoked" by the new MKB.

Using its device keys, a device calculates the media key by processing records of the MKB one-by-one from first to last. After processing of the MKB is completed, the device uses the most recently calculated media key value as the final value for the media key. If a device correctly processes an MKB using device keys that are revoked by that MKB, the resulting final media key will have the special value 0H, where H designates a hexadecimal number. This special value will never be an MKB's correct final media key value, and can therefore always be taken as an indication that the device's keys are revoked. If a device calculates this special media key value, it stops the authentication, playback, or recording session in progress, and will not use that media key value in any subsequent calculations.

A properly formatted MKB will have exactly one Verify Media Key Record (VMKR) as its first record. The VMKR contains the hexadecimal value DEADBEEF encrypted with the correct, final media key. The presence of the VMKR is mandatory, but the use of the VMKR by a device is not mandatory. A device may attempt to decrypt the VMKR using its current media key value during the processing of subsequent Records, checking each time for the hexadecimal value DEADBEEF. If the device successfully decrypts the VMKR, the device has already calculated the correct final media key value, and may therefore stop processing the MKB.

A properly formatted MKB will have exactly one calculate media key record (CMKR). Devices must ignore any CMKRs encountered after the first one in an MKB. The CMKR includes a column field. The column field indicates the associated column value for the device key to be used with this record, as described below. The CMKR also contains encrypted key data in each column corresponding to each of the device key rows. Before processing the CMKR, the device checks that the device has a device key with associated column value Cd_i==column, for some i.

If the device does not have a device key with the associated column value, the device ignores the rest of the CMKR. Otherwise, using the value i from the condition above, the device key and r=Rd_i, c=Cd_i, the device decrypts a media key value from the encrypted key data for row r=Rd_i. The resulting media key value becomes the current media key value.

A properly formatted MKB may have zero or more conditionally calculate media key records (C-CMKR). The C-CMKR contains encrypted conditional data. In the columns, the C-CMKR contains doubly encrypted key data. If decrypted successfully, as described below, the encrypted conditional data contains the hexadecimal value DEADBEEF and the associated column value for the device key to be used with this C-CMKR. Using its current media key value, the device decrypts conditional data from the encrypted conditional data.

Before continuing to process the Record, the device checks that the following conditions are true: the decrypted conditional data contains the hexadecimal value DEADBEEF and the device has a device key with a newly associated column value (i) decrypted from the conditional data. If any of these conditions is false, the device ignores the rest of the C-CMKR. Otherwise, using the value i from the condition above, the current media key value, and r=Rd_i, c=Cd_i, the device decrypts the doubly encrypted key data at the associated column in the C-CMKR. The device then decrypts the result of the first decryption of the doubly encrypted data using the device's i-th device key. The resulting media key becomes the current media key value.

Storing Validation Data in Read-Only Area

Figure 1:
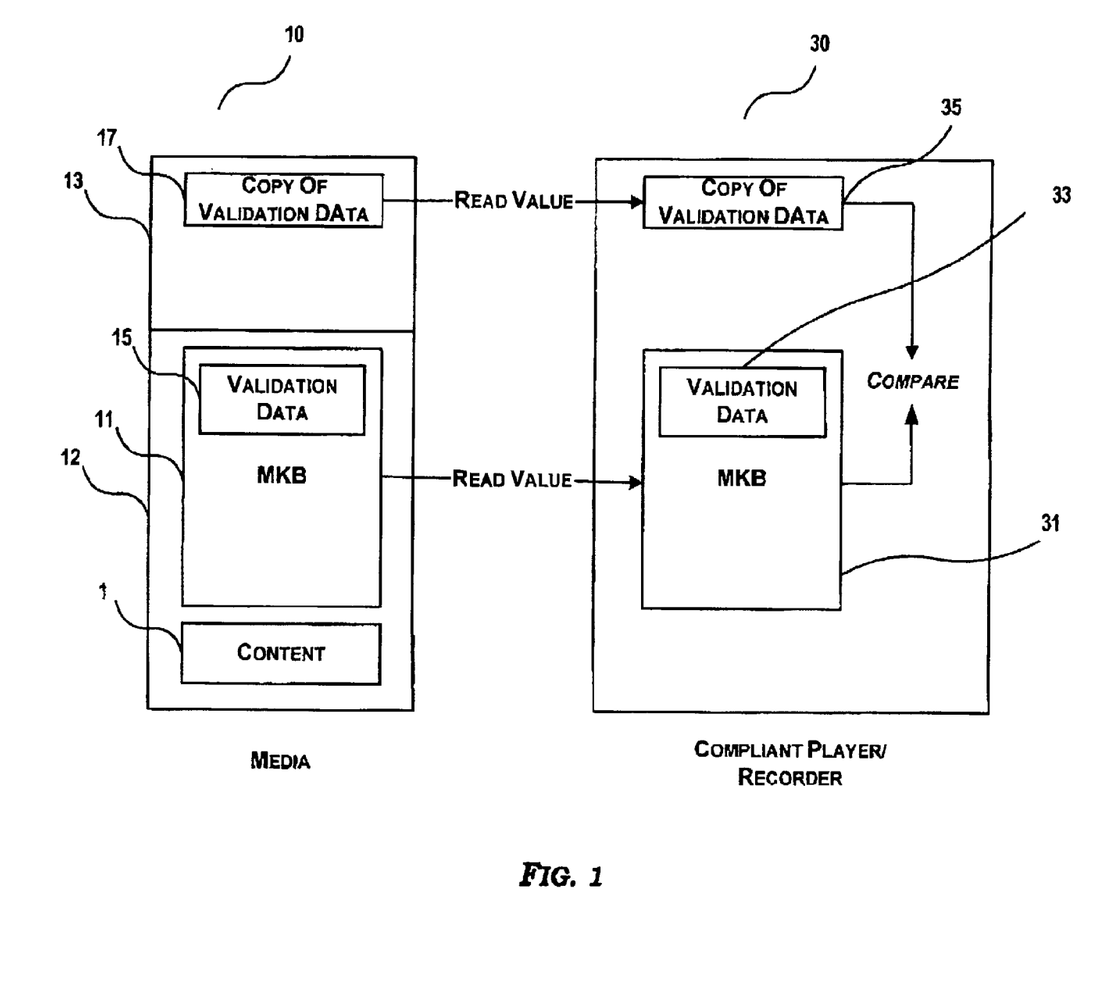
FIG. 1 is a simplified block diagram of an embodiment of the present invention.

Referring now to FIG. 1, an exemplary embodiment of a media (10) loaded into a media reader (30) is shown. The media reader (30) reads content (1) from the media (10). If the media (10) includes a writeable area (12), the media reader (30) may also write data to the writeable area (12) of media (10). As described above, the media reader (30) may be any device capable of reading information stored on a media. The media reader (30) includes microprocessors or other circuits to perform the decryptions, calculations and other processing discussed herein. The media (10) may be any media for storing information.

Media (10) includes a read-only area (13) and a media key block (MKB) (11) stored on the media (10). FIG. 1 illustrates the MKB (11) being stored on the writeable area (12) of the media (10). However, the MKB (11) may alternatively be stored on the read-only area (13) of the media (10) without departing from the spirit and scope of the invention.

Parts of the MKB (11) may be encrypted and includes a Verify Media Key Record (15). In one embodiment of the invention, the Verify Media Key Record (15) may also be referred to as "validation data", which is encrypted and contains a pre-selected value. It should be noted that some media readers (30) decrypt the validation data (15) during the processing of the MKB (11). In such cases, the present invention does not require an additional read operation over the prior art to retrieve the validation data (15).

A copy of the validation data (17) is stored on the read-only area (13) of the media (10). The read-only area (13) may comprise, for example, an embossed data zone or a validation area of a DVD. An exemplary embodiment in which the validation data (17) is stored in the validation area is described below. The copy of the validation data (17) is encrypted in the same manner as the validation data (15) is encrypted. Thus, when the copy of the validation data (17) and the validation data (15) are decrypted, the same value should be obtained if no malicious tampering has occurred.

Referring still to FIG. 1, the media reader (30) reads information from the media (10). The information that the media reader (30) reads from the media (10) includes the content (1) (after access is authorized), the MKB (31), the reader validation data (33), and a copy of the reader validation data (35). The media reader (30) decrypts the reader validation data (33), the reader copy of the validation data (35), or both using the media key obtained previously by processing the MKB. If the result of either decryption yields a decrypted value not equal to the preselected value, the media reader (30) refuses to authorize access to the content (1) stored on the media (10). If all of the decrypted values match the preselected value, the media reader (30) continues the authorization process.

It should be noted that the value of a data item as stored on the media (10) and the value of the data item as read by the media reader (30) may differ in an environment in which the content (1) is subject to piracy, direct attacks, man-in-the-middle attacks and other malicious tampering. Therefore, to distinguish between the validation data (15) stored on the media (10) and the validation data (33) read from the media (10) by the media reader (30), the validation data (15) may be referred to as the media validation data (15) and the validation data (33) may be referred to as the reader validation data (33). Similar distinctions can be made between other data items stored on the media (10) and the value of that data item as read by the media reader (30).

The media reader (30) compares the reader validation data (33) and the copy of the reader validation data (35). The comparison may be of either the encrypted values or the decrypted values. Both comparisons may also be made. If the value of the reader validation data (33) and the value of the copy of the reader validation data (35) are equal then the media reader (30) authorizes access to the content (1) stored on the media (10). If these values are not equal, the media reader (30) refuses to authorize access to the content (1) on the media (10).

Thus, by comparing the reader validation data (33) and the copy of the reader validation data (35) in conjunction with authorizing access, man-in-the-middle devices inserted between the media (10) and the media reader (30) may be detected. The method of authorizing access to the content used in conjunction with the comparison of the two copies of the validation data may be chosen from those methods well known to the art, including for example decrypting a media key from an MKB. A man-in-the-middle alteration of either copy of the media validation data (15 or 17) may be detected by the comparison of the encrypted or decrypted values of the copies of the reader validation data (33 and 35). A man-in-the-middle alteration of both copies of the media validation data will be detected by checking for the preselected value in either decrypted copy of the reader validation data, or in both decrypted values.

Figure 2:
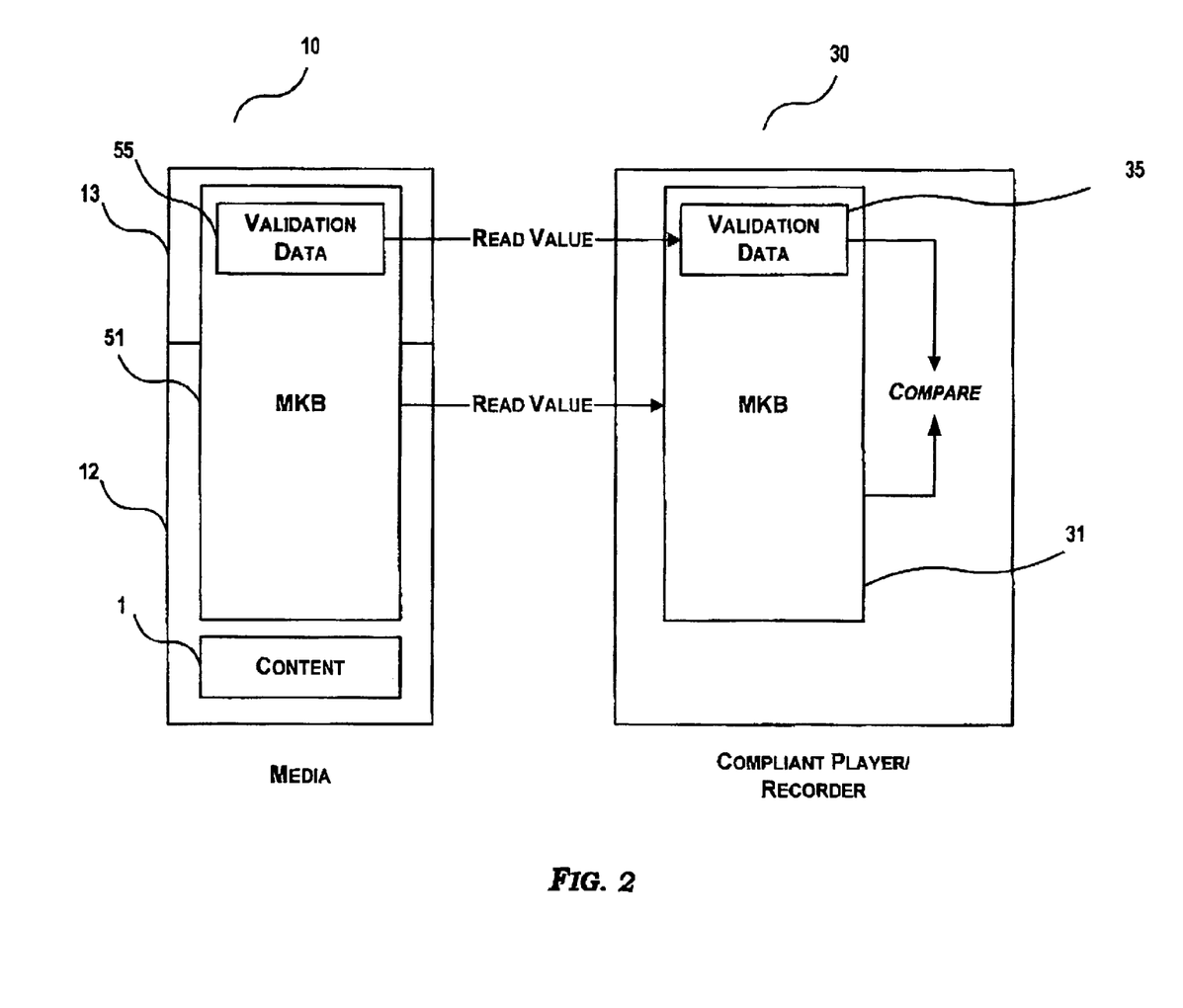
FIG. 2 is a simplified block diagram of another embodiment of the present invention.

Referring now to FIG. 2, another exemplary embodiment of a media (10) and a media reader (30) of the present invention is shown. In this embodiment, the MKB (51) is stored on the media (10) so as to straddle the boundary between the read-only area (13) and the writeable area (12), with the media validation data (55) being stored on the read-only area (13). No copy of the validation data is required in this embodiment because the read-only nature of the read-only area (13) of the media (10) protects the validation data from unauthorized tampering.

Figure 3:
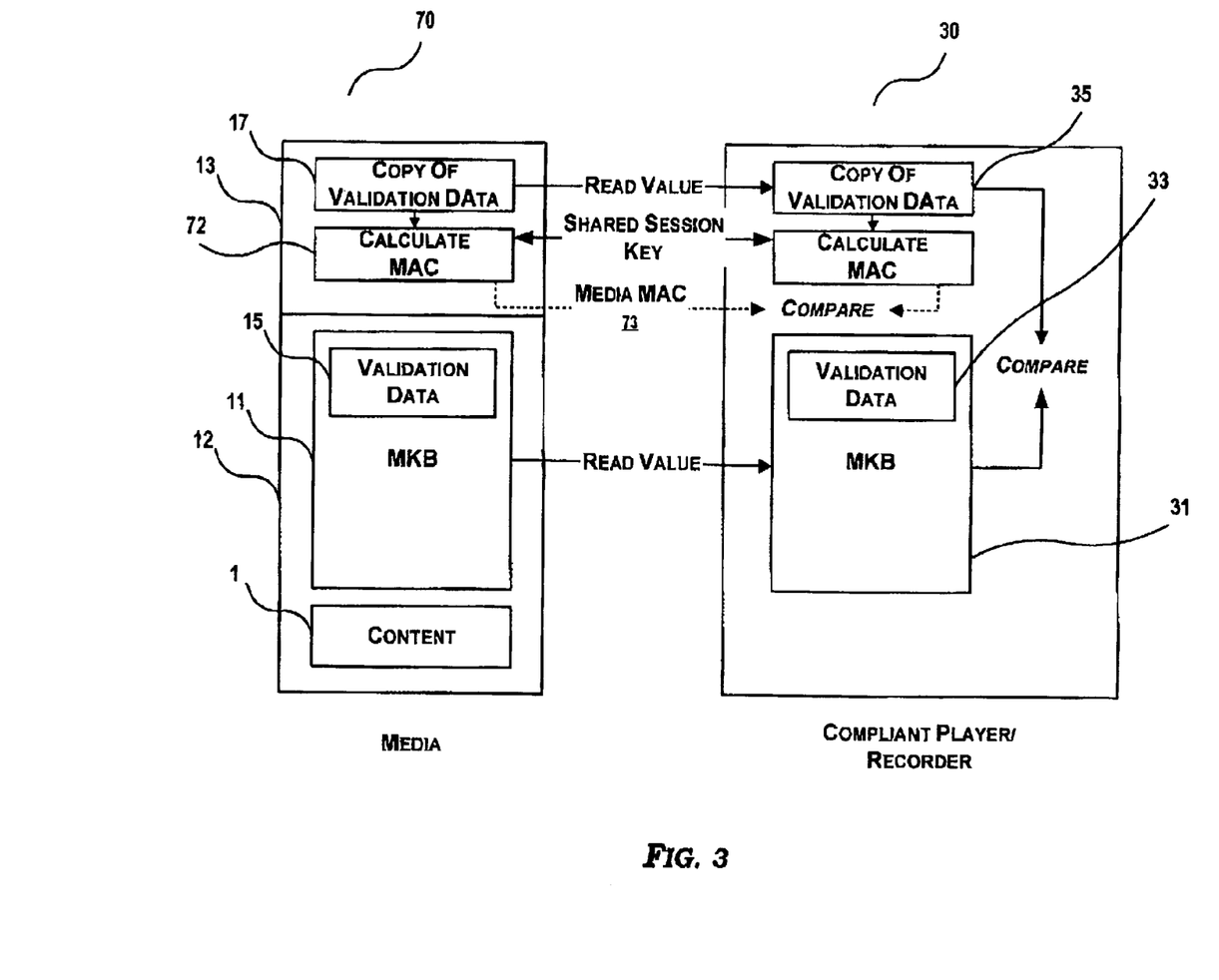
FIG. 3 is a simplified block diagram of another embodiment of the present invention.

Referring now to FIG. 3, yet another exemplary embodiment of a media (70) and a media reader (30) of the present invention is shown. In this embodiment, the media (70) includes both the physical media on which the content is stored and a processor or other logic circuit (72). For instance, the media (70) may be a flash memory array including a processor. Another example of a media with a processor is a DVD drive with a CPU to manage the driver. Though, those skilled in the art will recognize that other combinations of media with a processor are obvious. As with other embodiments, the media may also contain a writeable area (12).

Another embodiment of the present inMention includes a personal computer having a processor and an input/output device such as a DVD drive. A media (70) having a content (1) stored on it is loaded into the input/output device. Upon sensing the presence of the media (70), or upon user command, the processor attempts to access the content stored on the media (70). Thus, the processor of the personal computer acts as a media reader (30) and the input/output device acts as a media (70). The processor may be configured to process the media validation data (15) and the copy of the media validation data (17), as set forth herein. As will be obvious to those skilled in the art, the combination of a media (70) and a media reader (30) form a system for protecting and accessing the content (1).

Using a Message Authentication Code (MAC)

A message authentication code may be employed in addition to the validation data discussed previously. To include a message authentication code (MAC) in the present embodiment, the media (70) calculates a media MAC (73) over the copy of the media validation data (17) using a run-time session key established via authentication and key exchange between the media (70) and a media reader (30). In effect, the media (70) electronically signs the media MKB (11) with the media MAC (73).

The media reader (30) reads the media MAC (73) from the media (70). The media reader (30) also reads the copy of the media validation data (17) and calculates a reader MAC (75) over the copy of the reader validation data (35) using the same algorithm as was used to calculate the media MAC (73).

By comparing the reader MAC (75) and the media MAC (73), the media reader (30) makes a second determination of whether authorization for access to the contents (1) of the media (70) should be granted. Should the reader MAC (75) and the media MAC (73) differ, the media reader (30) refuses access to the contents (1) of the media (70). If the two MACs are identical, the media reader (30) allows access to the contents (1) of the media (70). Thus, the media reader (30) checks the electronic signature of the media. The calculation and comparison of the reader and media MACs may occur at any time during the authorization process, including before or after the validation data integrity check is executed.

Thus, a MAC provides another level of protection against man-in-the-middle alterations to the MKB (11). If the man-in-the-middle device alters the copy of the media validation data (17) as the copy of the media validation data (17) is being read from the media (10), the media MAC (73) and the reader MAC (75) will differ.

Figure 4:
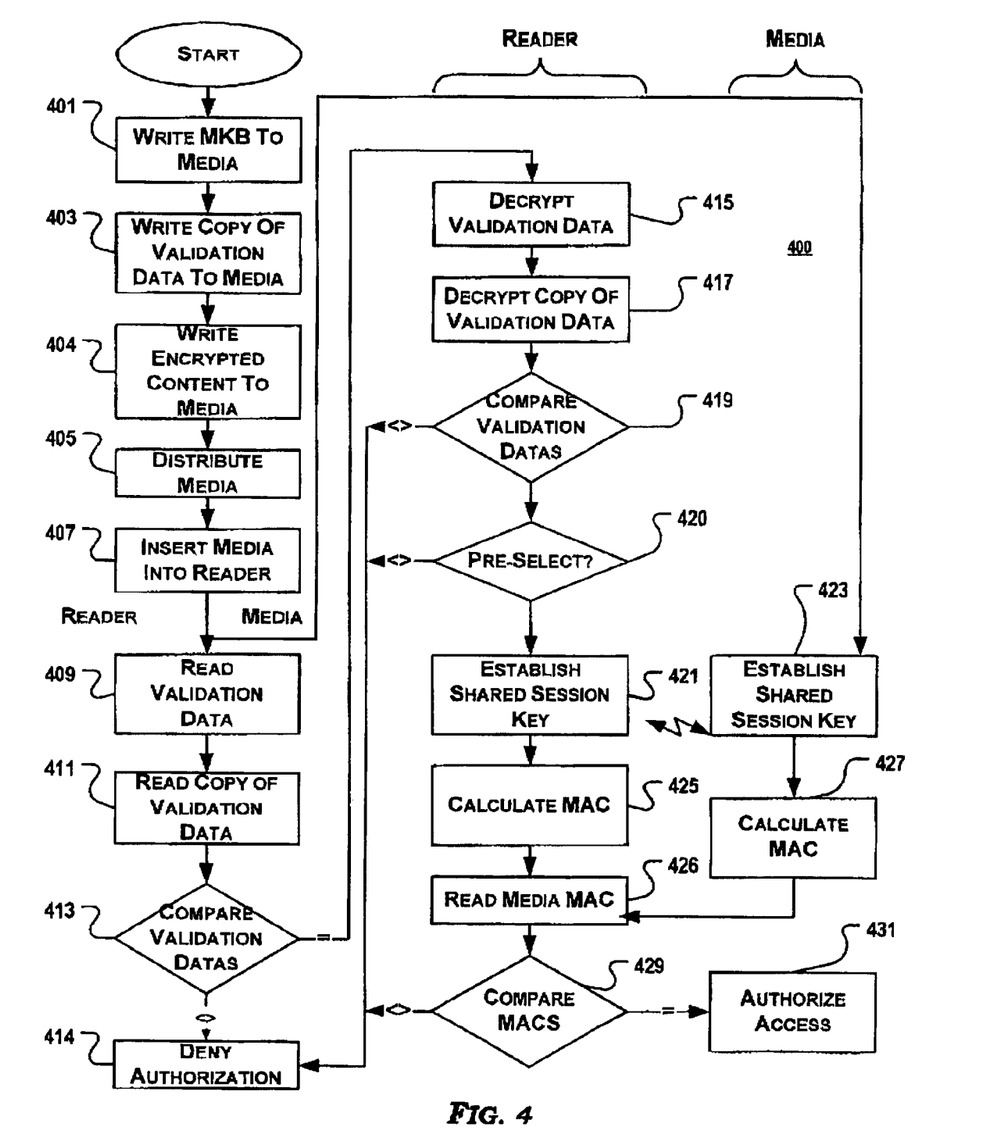
FIG. 4 is a simplified flowchart of a method of the present invention.

Referring now to FIG. 4, an embodiment of a process (400) for authorizing access to content stored on media of the present invention is shown. Before the media is distributed, the MKB including the media validation data is stored on the media (block 401). The media validation data may be stored on the read-only area of the media or it may be stored on the writeable area of the media. If the media validation data is stored on the writeable area then a copy of the media validation data is stored on the read-only area (block 403). The content is encrypted using the correct media key and then stored on the media before the media is distributed in block 405. In block 407 the user inserts the media into a media reader or connects the media and media reader as dictated by the form of media employed.

Another embodiment includes a media which encrypts and stores content. In other words, the media of this embodiment may be a content recorder such as a CD-RW drive. Thus, the media may execute block 404.

Upon sensing the presence of the media or upon a command or request from the user or other device, the media reader reads the media MKB including the media validation data from the media in block 409. If a copy of the media validation data has been previously stored on the read-only area of the media, the media reader also reads the copy of the media validation data from the media in block 411.

The media reader may then compare the encrypted value of the reader validation data read from the media with the encrypted value of the copy of the reader validation data read from the media at block 413. If the two values are different the media reader denies authorization to access the content in block 414. Otherwise, the authorization process may continue with block 415.

In blocks 415 and 417, the media reader decrypts the reader validation data read from the media and the copy of the reader validation data read from the media. The media reader may then compare the decrypted values of the reader validation data and of the reader copy of the validation data, as in block 419 using the media key obtained by processing the MKB. If the two values are different the media reader denies authorization to access the content. Otherwise, the authorization process continues with block 420.

In block 420, the media reader compares either the decrypted value of the reader validation data or the decrypted value of the copy of the reader validation data to the pre-selected value. In the alternative, the reader may compare both the decrypted reader validation data and the decrypted copy of the reader validation data to the pre-selected value. If any one of the comparisons fails, then the media reader denies authorization to access the content.

In blocks 421 and 423, the media and media reader establish a shared session key in any manner known to the art. The media reader, in block 425, calculates a reader MAC over a reader hash value of the reader MKB read from the media. The media, in block 427, likewise calculates a media MAC over a media hash value of the media MKB. In blocks 426 and 429, the driver then reads the media MAC from the media and compares it to the reader MAC. If the two values are different the media reader denies authorization to access the content at block 414. Otherwise, the driver may authorize access to the content or may process the MKB, as shown in block 431.

Another exemplary embodiment includes processing the MKB to obtain the correct media key; decrypting the validation data with the media key; verifying that the validation data contains the correct preselected value; and comparing the encrypted value of the validation data in the MKB with the encrypted validation data over which a MAC has been successfully calculated by the device and reader.

Another exemplary embodiment includes successfully calculating a MAC over the validation data; decrypting the validation data stored on the read-only area of the media; and verifying that the validation data contains the correct preselected value.

Yet another embodiment includes calculating and comparing the MACs before reading the two copies of the validation data. Thus, when the reader reads either copy of the validation data the MAC may accompany the validation data.

Storing Validation Data in a VA (Validation Area) Region of a Read-Only Area

Figure 5:
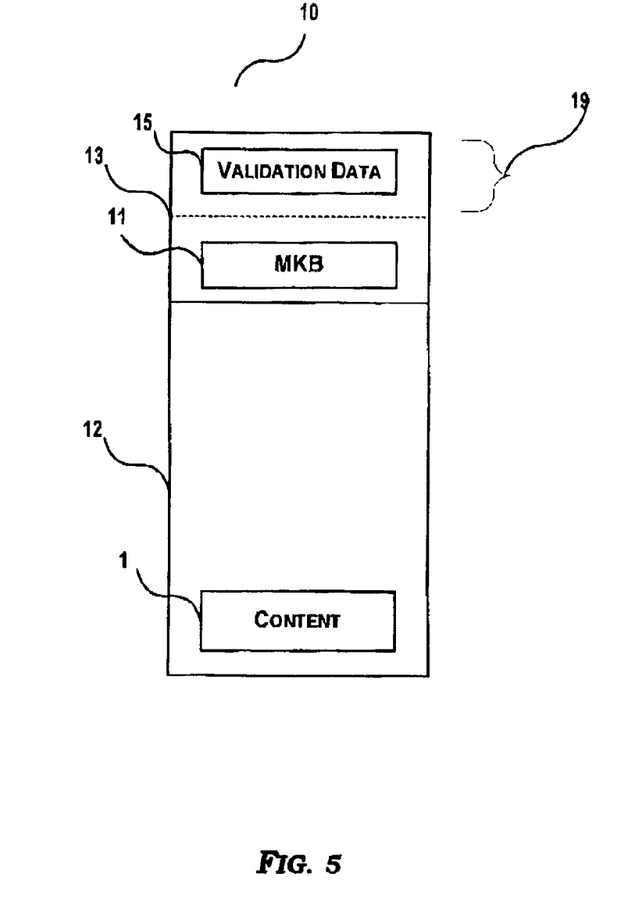
FIG. 5 illustrates an embodiment in which the read-only area comprises a validation area of a medium.

In one exemplary embodiment, as illustrated in FIG. 5, validation data (15) may be stored in a special region of the read-only area (13) called a validation area (19) (also referred to as a VA, or a VA region). A VA region is a portion of certain media types that has physical properties that make it difficult to mimic using ordinary consumer recording equipment/media. A VA region requires special manufacturing equipment to write, making its contents difficult to copy. Furthermore, since the VA is read using a physically different process from that used to read the other areas of a medium, a device can physically distinguish contents written to a VA from contents that may have been written by an ordinary recorder on ordinary recordable media.

It should be understood by one of ordinary skill in the art that the term "VA" or "VA region" is to be construed as an area having the general properties described herein, and that the term "VA" or "VA region" shall not preclude other areas having the properties of a VA described herein from being construed as an equivalent of a VA.

Examples of CAs include a burst cutting area (BCA) of a DVD-ROM (Digital Versatile Disc-Read-Only Memory) and a DVD-RAM (Digital Versatile Disc-Random Access Memory); and a narrow burst cutting area (NBCA) of a DVD-R (Digital Versatile Disc-Recordable) and DVD-R/W (Digital Versatile Disc-Rewriteable). (DVD-Rs and DVD-RWs shall together be referred to as DVD-R/Ws.)

Validation data may comprise a copy of the verify media key record (15), as discussed above. In other embodiments, validation data may comprise a copy of the Verification Data field of the Verify Media Key Record, and/or a hash function on the MKB, also known as the MKB_Hash.

Validation Data Comprising MKB_Hash

Validation data may comprise MKB_Hash. This can, for example, help to maintain compatibility with DVD-RAMs, where MKB_Hash is stored in a CDA of a DVD-RAMs read-only area in a PC based system having a drive-host configuration where CPRM content protection is used. In such a system, a DVD drive and PC host act together as a recording device and/or playback device for CPRM protected content. In a drive-host configuration, the host verifies the integrity of the MKB it receives from the drive. It does this by using a message authentication code (MAC) calculation algorithm.

Figure 6:
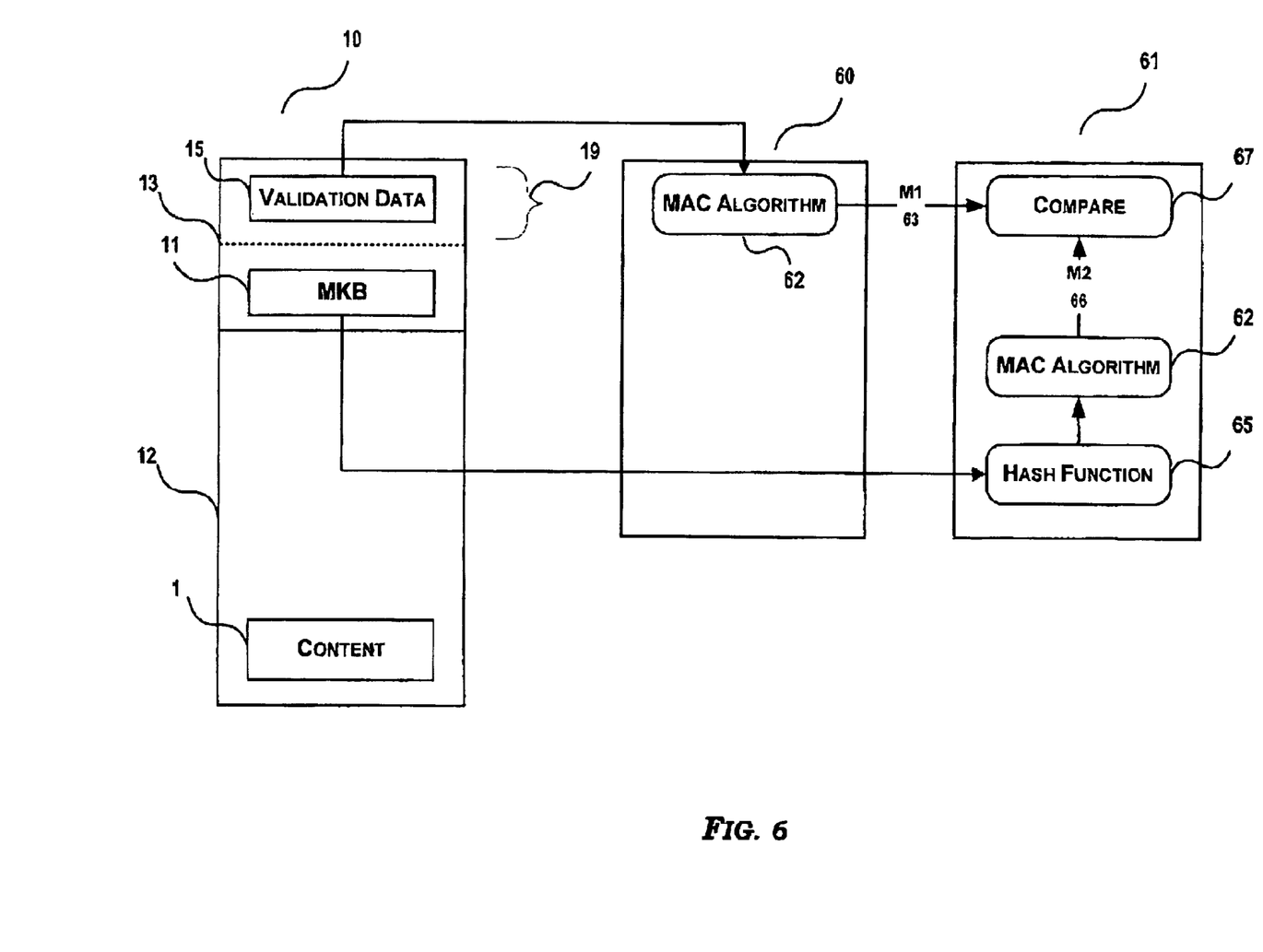
FIG. 6 illustrates one exemplary system which utilizes the validation area of a medium to validate data.

In DVD-R/W formats, for instance, the manufacturer calculates MKB_Hash, and stores the result in the NBCA. For example, MKB_Hash may be calculated as C2_H (MKB), where C2_H is a hashing procedure based on a C2 encryption algorithm used in CPRM technology, and where MKB includes the entire MKB Frame minus the MKB Descriptor. In a drive-host configuration, validation data comprises MKB_Hash, which is used to verify the integrity of the MKB on both a DVD-RAM and a DVD-R/W, as illustrated in FIG. 6.

Upon request from the host (61), the drive (60) requests the first MKB Pack (MKB Pack #0) from a DVD-R/W, and reads an MKB_Hash (15) from the NBCA (19). Using a MAC calculation algorithm (62), a drive MAC, m1 (63), is calculated over the MKB_Hash (15) value, and part of the MKB Descriptor of MKB Pack #0 is replaced with m1 (63). The modified MKB Descriptor is then returned to the host (61). If there are more MKB Packs available, the host (61) reads them from the drive (60). Then, using the MKB and any unused (zero-valued) bytes that follow it in the MKB Frame, the host (61) calculates a value, h, as:

h=C2_H (MKB and trailing zeros), where C2_H (65) represents the hash function used to calculate MKB_Hash (15).

Using the resulting h value, the host then uses the MAC algorithm (62) to calculate a host MAC, m2 (66) as:

m2=DVD-MAC (h).

A compare function (67) of the host (61) verifies the integrity of the received MKB (11) by determining if m1=m2. If verification fails, then the host (61) aborts the playback or recording session in progress. Otherwise, it calculates a media unique key ($K_{mu}$). Note that whether the host (61) verifies the MKB's (13) integrity before or after the calculation of the media key ($K_m$) is implementation-defined.

Figure 7:
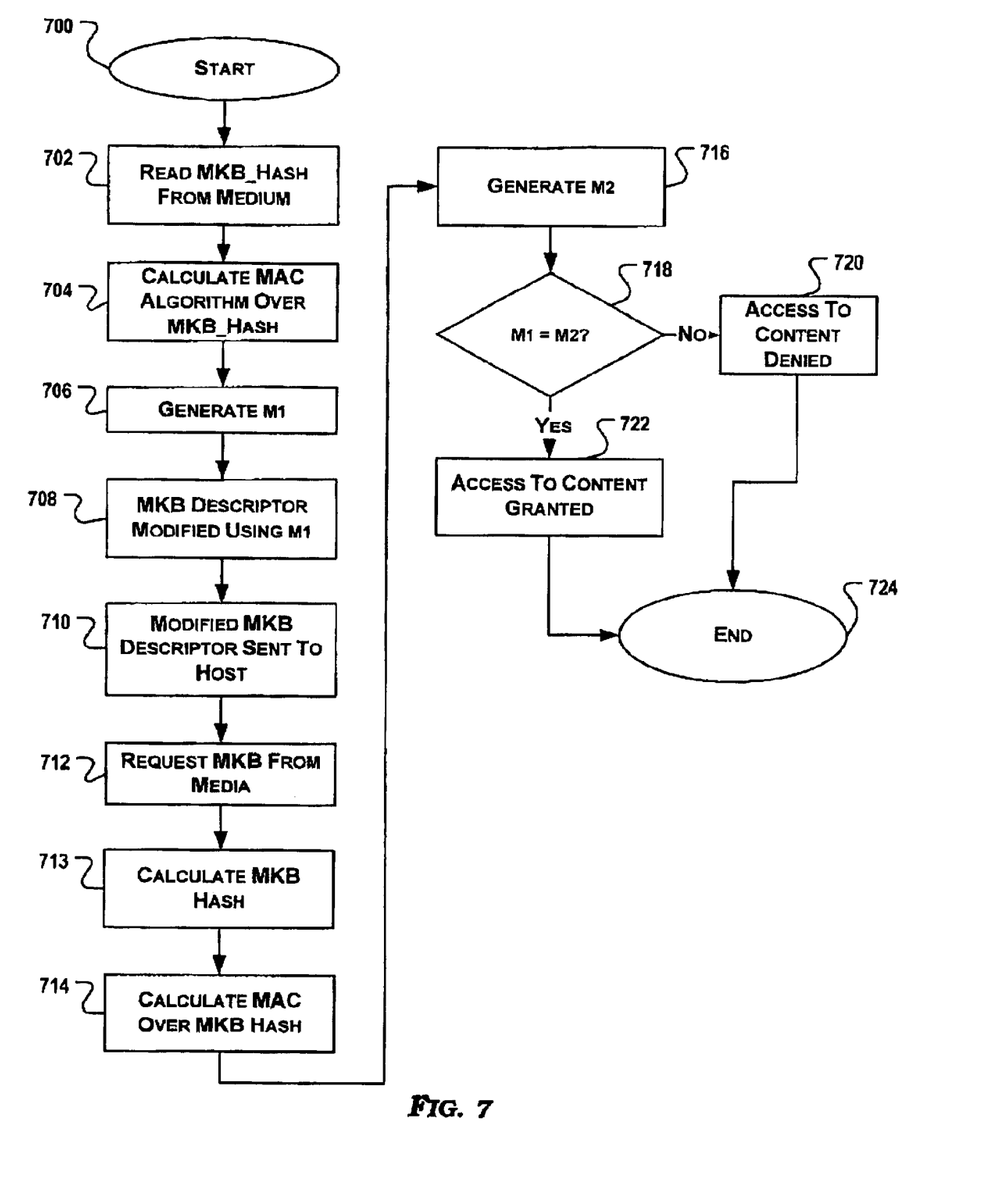
FIG. 7 illustrates a method of FIG. 6.

A method for MKB validation in a drive-host configuration is shown in FIG. 7, starting at block 700. At block 702, the drive reads the MKB_Hash from the media, and calculates a MAC algorithm over the MKB_Hash at block 704. A drive MAC, m1, is generated at block 706, and parts of the MKB Descriptor of the MKB are replaced at block 708. The modified MKB Descriptor is sent to the host at block 710. The host then requests the MKB from the media at block 712, and calculates the MAC algorithm over the MKB at block 714. At block 716, a host MAC, m2, is generated at block 716. At block 718, m1 is compared to m2, and access is denied at block 720 if m1 does not equal m2, or granted at block 722 if m1 equals m2. The method ends at block 724.

Validation Comprising Verification Data Field

Validation data may comprise a copy of the Vanfication Data field of the Verify Media Key Record, supra.

Figure 8:
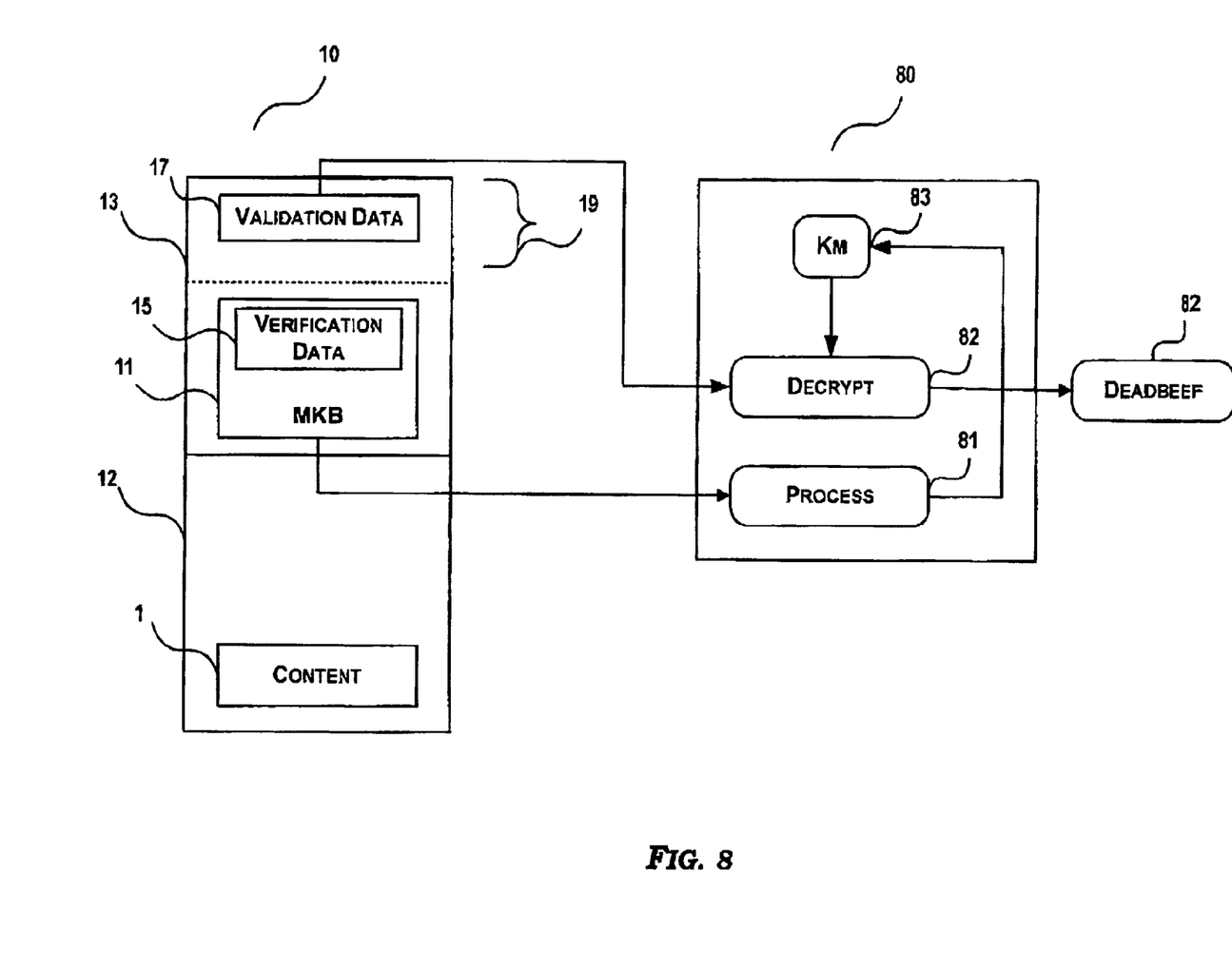
FIG. 8 illustrates another exemplary system which utilizes the validation area of a medium to validate data.

To implement this, a copy of the Verification Data field of the MKB's Verify Media Key record is stored in the NBCA. As shown in FIG. 8, a CE device (80) authenticates the MKB (11) on a DVD-RIW by processing (81) the MKB (11) from the DVD-R/W disc, as described above. The CE device (80) uses the resulting Media Key ($K_m$) (83) to decrypt (82) the copy of the Verification Data field (17) stored in the NBCA of the DVD-R/W, ensuring that it decrypts to the hexadecimal value DEADBEEF (84) before proceeding.

Figure 9:
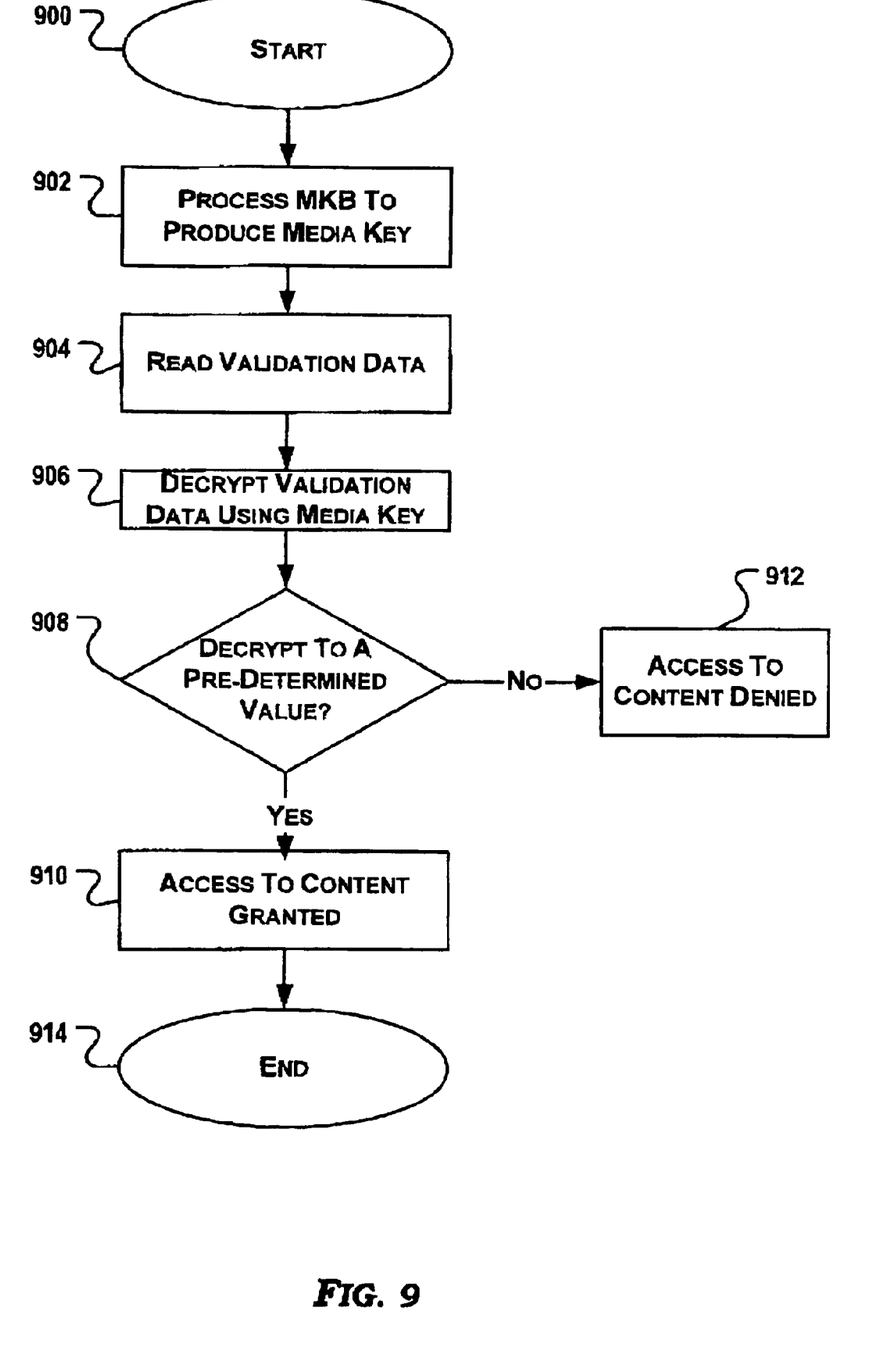
FIG. 9 illustrates a method of FIG. 8.

A method for MKB validation in a drive-host configuration is shown in FIG. 9, starting at block 900. At block 902, the MKB is processed to produce a media key. The CE device then reads the validation data at block 904. Using the media key, a decryptor decrypts the validation data at block 906. If the validation data decrypts to a pre-determined value (i.e., hexadecimal value for DEADBEEF) as checked at block 908, then the CE device grants access to the contents at block 910. Otherwise, the CE device denies access to the contents at block 912. The method ends at block 914.

Maintaining Compatibility With DVD-RAMs

In an exemplary embodiment, full compatibility between DVD-RAMs and DVD-R/Ws, for example, is achieved without regard to the device being used. Thus, both an MKB_Hash and Verification Data are stored in the NBCA of DVD-R/Ws. By storing both types of validation data ip the validation area of a disc, the integrity of an MKB may be verified on both DVD-RAMs and DVD-R/RWs with little or no modification to media readers.

By placing the MKB_Hash (15) in the VA (19) of a medium, compatibility with currently existing media types using MKB_Hash (15) to validate MKBs (11) can be maintained. The device is merely subject to a minor adjustment for determining whether to read the MKB_Hash from the control data area (CDA) of a DVD-RAM or to read the MKB_Hash from the NBCA of a DVD-R/RW. In CPRM format, a media reader can differentiate between media types by reading the MKB of the media. Furthermore, the drive interface command and returned data are the same for DVD-R/W and DVD-RAM, and the host verifies the authenticity of the MKB using the identical procedures previously defined by the CPRM specification.

The integrity of an MKB on both DVD-RAMs and DVD-R/RWs may be verified in consumer electronics players/recorders (hereinafter referred to as "CE devices") with minor adjustments to the CE device. Whereas a CE device reads verification data from the Control Data Area of a DVD-RAM to verify the MKBs authenticity, in a manner described above for reading validation data from the read-only area of a medium, a CE device reads the MKB_Hash from the NBCA of a DVD-R/W to verify the MKBs authenticity. Again, a media reader can differentiate between media types by reading the MKB of the media in CPRM format.

Conclusion

Thus, embodiments of the invention provide a robust means of validating a media key block to protect content, such as CPRM content on DVD-R/W media, against unauthorized copying. The enhanced protection is enabled by new discs and new devices that use the invention. At the same time, full interoperability among new and old devices, and new and old media is maintained with little or no modifications to media readers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while exemplary embodiments have been described, it should be understood by one of ordinary skill in the art that concepts of this invention can be applied to other types of content, content protection systems, and media formats. For example, while the exemplary embodiments described herein are specific to DVD media as they relate to a current form of protection (i.e. CPRM), one of ordinary skill in the art would understand that other forms of protection currently existing or to be developed in the future may apply as well.

Furthermore, while embodiments of the invention described herein refer to an area called the validation area, it should be understood that the validation area is an area having characteristics described herein, and that such an area is not limited to areas that are called, or that contain the term, validation area. As an example, DVD-ROMs and DVD-RAMs corpprise a validation area called a burst cutting area, while DVD-Rs and DVD-RWs comprise a validation area called a narrow burst cutting area.

What is claimed is:

1. A method comprising:
   reading a media key block from a medium;
   generating a media key from the media key block;
   reading validation data related to the media key block from a read-only area of the medium;
   decrypting the validation data using the media key; and
   verifying the authenticity of the media key block if the validation data decrypts to a predefined value.

2. The method of claim 1, wherein the validation data comprises a verification data field of the media key block's verify media key record.

3. The method of claim 1, wherein the predefined value comprises a hexadecimal value equal to DEADBEEF.

4. The method of claim 1, wherein the read-only area comprises a validation area of the medium.

5. The method of claim 4, wherein the medium is protected using Content Protection For Recordable Media (CPRM) format.

6. The method of claim 5, wherein the validation area of the read-only area comprises a narrow burst cutting area, and the medium is one of:
   a DVD-R (Digital Versatile Disc-Recordable); and
   a DVD-RW (Digital Versatile Disc-Rewriteable).

7. A method comprising:
   determining a media type associated with a medium to be read;
   reading a media key block from a first region on a medium;
   reading validation data related to the media key block from a second region on the medium, the second region based on the determined media type; and
   validating the media key block using the validation data.

8. The method of claim 7, wherein said validating the media key block using the validation data comprises
   granting authorization to access the content if the media key block corresponds to the validation data.

9. The method of claim 7, wherein the media type comprises one of:
   DVD-R (Digital Versatile Disc-Recordable); and
   DVD-RW (Digital Versatile Disc-Rewriteable);
   and the second region comprises a narrow burst cutting area region of a read-only area of the medium.

10. The method of claim 7, wherein the media type comprises DVD-RAM (Digital versatile Disc-Random Access Memory), and the second region comprises a control data area of a read-only area of the medium.

11. A machine-readable medium having stored thereon data representing sequences of instructions, the sequences of instructions which, when executed by a processor, cause the processor to perform the following:
   determine a media type associated with a medium to be read;
   read a media key block from a first region on a medium;
   read validation data related to the media key block from a second region on the medium, the second region based on the determined media type; and validate the media key block using the validation data.

12. The machine-readable medium of claim 11, wherein said validating the media key block using the validation data comprises granting authorization to access the content if the media key block corresponds to the validation data.

13. The machine-readable medium of claim 12, wherein the media key block corresponds to the validation data if the validation data decrypts to a predetermined value using a media key derived from the media key block.

14. The machine-readable medium of claim 12, wherein the media key block corresponds to the validation data if a MAC (Message Authentication Code) calculation algorithm over the media key block matches a MAC calculation algorithm over validation data.

15. A machine-readable medium having stored thereon data representing sequences of instructions, the sequences of instructions which, when executed by a processor, cause the processor to perform the following:

read a media key block from a medium;

generate a media key from the media key block;

read validation data related to the media key block from a read-only area of the medium;

decrypt the validation data using the media key; and verify the authenticity of the media key block if the validation data decrypts to a predefined value.

16. The machine-readable medium of claim 15, wherein the validation data comprises a verification data field of the media key block's verify media key record.

17. The machine-readable medium of claim 15, wherein the read-only area comprises a validation area of the medium.

18. A system comprising:

a medium having:
   a writeable area;
   content stored on the writeable area;
   a read-only area;
   a media key block stored on the medium; and
   validation data for verifying the authenticity of the media key block, the validation data being stored on the read-only area; and a device to:
   read a media key block;
   generate a media key from the media key block;
   read validation data related to the media key block, the validation data being read from the read-only area of the medium;
   decrypt the validation data using the media key; and
   verify the authenticity of the media key block if the validation data decrypts to a predefined value.

19. The system of claim 18, wherein the device comprises a consumer electronics device.

20. The system of claim 18, wherein the medium comprises a DVD-R (Digital Versatile Disc-Recordable), and the read-only area comprises a narrow burst cutting area of the medium.

21. The system of claim 18, wherein the medium comprises a DVD-RW (Digital Versatile Disc-Rewriteable), and the read-only area comprises a narrow burst cutting area of the medium.

22. An apparatus comprising:

means for reading a media key block from a medium;

means for generating a media key from the media key block;

means for reading validation data related to the media key block, the validation data being read from a read-only area of the medium;

means for decrypting the validation data using the media key; and means for verifying the authenticity of the media key block if the validation data decrypts to a predefined value.

23. The apparatus of claim 22, wherein the validation data comprises a verification data field of the media key block's verify media key record.

24. The apparatus of claim 22, wherein the read-only area comprises a validation area of the medium.

\* \* \* \* \*